United States Patent [19]

Richter

[11] Patent Number: 4,692,367
[45] Date of Patent: Sep. 8, 1987

[54] METHOD OF MAKING A THERMALLY STABLE COMPOSITE HONEYCOMB PANEL

[75] Inventor: Mark A. Richter, Jupiter, Fla.

[73] Assignee: The United States of America as represented by the Secretary of the Army, Washington, D.C.

[21] Appl. No.: 856,064

[22] Filed: Apr. 24, 1986

[51] Int. Cl.$^4$ .................. B32B 7/04; B32B 31/20
[52] U.S. Cl. ........................ 428/116; 156/89; 428/408
[58] Field of Search ............ 156/89; 428/192, 116, 428/210, 325, 408

[56] References Cited

U.S. PATENT DOCUMENTS 4,353,966  10/1982  Snitzer et al. ............ 156/89

FOREIGN PATENT DOCUMENTS 2403999  8/1974  Fed. Rep. of Germany ........ 156/89

*Primary Examiner*—Caleb Weston
*Attorney, Agent, or Firm*—John C. Garvin, Jr.; Freddie M. Bush

[57] ABSTRACT

A method for forming a thermally stable honeycomb panel which may be used in constructing large mirrors employs thermally stable composite planks comprised of about 50% graphite fibers and of about 50% borosilicate glass. These planks which are formed by hot pressing in vacuum serve as a basic construction material.

The thermally stable honeycomb panel is comprised of a core member, a backplate member, and a faceplate member which are bonded by bonding process after a wet frit paste is first applied and then dried to remove volatile solvents. The bonding is completed in an oven in an air atmosphere at a temperature sufficient to melt the glass in the frit paste after the organic binder material is boiled out. After holding the honeycomb panel components at a predetermined temperature for ensuring that all the glass in the frit is melted, the bonded panel is allowed to cool to room temperature. The glass re-soldifies to form bond strengths between the core member, backplate member, and faceplate member which exhibit parent material strength.

The thermally stable honeycomb panel has a thermal expansion value in the range from about $-5$ to about $+5 \times 10^{-7}$ inch/inch/°C. over a range of about 0° C.–300° C.

2 Claims, 3 Drawing Figures

METHOD OF MAKING A THERMALLY STABLE COMPOSITE HONEYCOMB PANEL

DEDICATORY CLAUSE

The invention described herein was made in the course of or under contract DAAH01-81-C-B059 or a subcontract thereunder with the Government and may be manufactured, used, and licensed by or for the Government for governmental purposes without the payment to me of any royalties thereon.

BACKGROUND OF THE INVENTION

Large mirrors are under development for potential high-energy-laser defense applications, for use in communications, and for use in both strategic and earth-resource surveillance. Currently, mirrors up to 2.3 meters in diameter are being produced, and there may be a need in the future for mirrors several times larger than this. High-energy mirrors have employed molybdenum surfaces. To reflect intense radiation without thermal distortion, the mirrors are provided with high reflectivities (greater than 99%) and are cooled by a fluid circulated under the surface plate.

Constructing large lightweight mirrors is currently achieved mostly from ultra low expansion glass. The ultra low expansion glass sections are put together by welding angles of the glass into box sections, a labor and material intensive process.

Of higher potential usefulness would be panels which may be made by adhesive bonding or brazing, but several problems are inherent in these methods. The useful temperature range of adhesives is low, and creep may occur in such bond joints at low stress levels, altering the mirror's surface figure. Brazing the joints in a composite panel is a difficult and costly process, and thermal expansion mismatch between the braze material and the composite material cause durability problems.

An improved composite panel which provides high vibrational damping and a thermal-expansion coefficient equal to zero would be attractive for use as supporting frames for optics, particularly large mirrors.

Therefore, an object of this invention is to provide a thermally stable lightweight honeycomb panel constructed of a composite of graphite reinforced glass and bonded with a bonding agent to the desired configuration by a process which includes firing the bonded panel in an oven to a specific time and temperature profile to yield a structure having bonds between the parts exhibiting parent material strength.

SUMMARY OF THE INVENTION

Thermally stable composite planks are formed by hot pressing in vacuum to a desired configuration. These planks are comprised of approximately 50% graphite fiber (Thornel 300 or equivalent) and 50% borosilicate glass. These thermally stable composite planks are joined together by a frit bonding process to form a honeycomb core member. This honeycomb core member is useful for the contruction of space frames to support multi-element optics. This material provides high vibrational damping, and the thermal-expansion coefficient can be made equal to zero.

A glass paste is employed in the frit bonding process of this invention as a suspension of powdered glass frit and organic binders designed to boil out completely before the glass-melting temperature is reached. The organic binder serves to hold the frit in proper suspension in the form of a paste with an average visocity of 200,000 cps. To provide proper fluidity a volatile organic carrier selected from an alcohol or ether, or an acetone is employed with the glass paste.

An organic binder of a saturatured hydrocarbon such as the paraffins or alkanes of the formula $C_nH_{2n+2}$ or halogenated paraffins thereof, which can be distilled off or dissociated in the range of about 175° C.–200° C. but does not leave a residue, functions to hold the glass frit in the form of a paste during application. After application, drying to remove volatile solvents is achieved by air drying, and this drying can be enhanced by use of infrared lights.

DESCRIPTION OF THE PREFERRED EMBODIMENT

Thermally stable composite planks are formed by hot pressing in vacuum a composite of approximately 50% graphite fibers and 50% borosilicate glass.

These thermally stable composite planks are joined together by a frit bonding process to form a honeycomb core member. The thermally stable planks have a low coefficient of thermal expansion thus making them attractive for further processing in a frit bonding process to yield a frit-bonded assembly.

Figure 1:
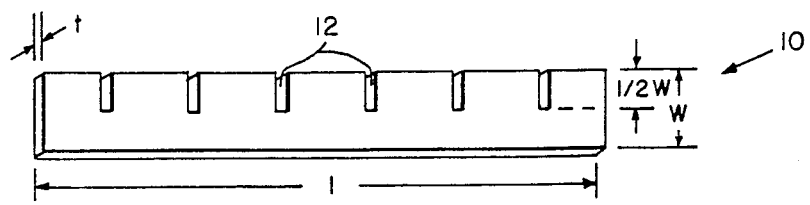
FIG. 1 depicts a flat plank constructed of graphite fiber reinforced glass. The flat plank is notched to provide a slot depth of ½ the width and a slot width equal to the thickness of the flat plank.

In making the frit-bonded assembly, thermally stable composite planks having a uniform thickness "t" and a uniform width "w" are individually notched to provide a notched plank 10 with a plurality of slots 12 having a depth of ½ w and a width of "t". The notched plank with a length l is illustrated in FIG. 1.

Figure 2:
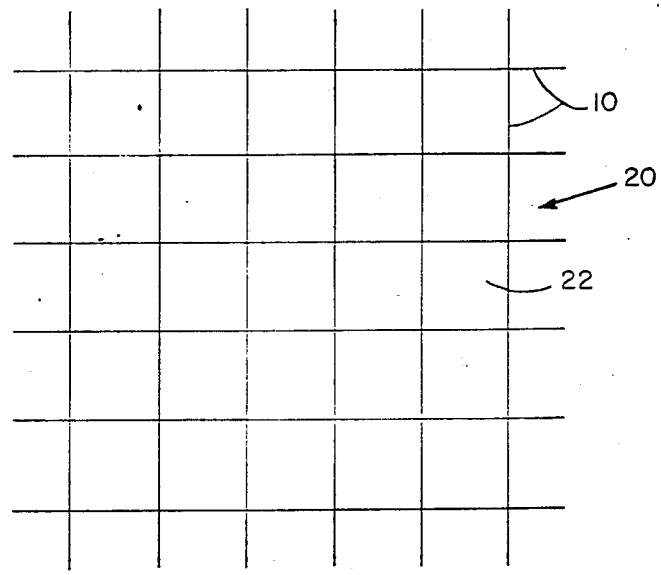
FIG. 2 depicts 12 flat, notched planks interlocked to form a 25 cell honeycomb core member.

A honeycomb core member 20 is illustrated in FIG. 2. Shown are 12 flat, notched planks 10 in an interlocked structure to form a 25 cell (22) honeycomb core member.

Figure 3:
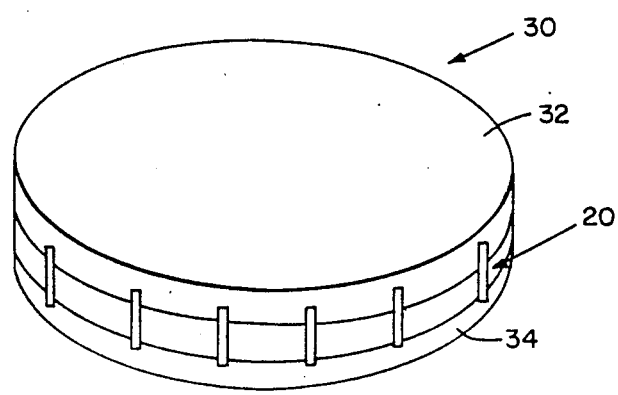
FIG. 3 depicts a honeycomb panel comprised of a honeycomb core member with a top faceplate member and a bottom backplate member bonded thereto.

FIG. 3 illustrates a honeycomb core member 20 having a faceplate member 32 and backplate member 34 bonded thereto to form a thermally stable honeycomb panel 30.

The frit used as a bonding agent for the notched planks is a suspension of finely powdered borosilicate glass suspended in organic binders (such as saturated hydrocarbons) which are designed to boil out completely below the glass melting temperature of the thermally stable planks. The organic binders serve to hold the frit in proper suspension in the form of a paste with visocities which can be varied in a wide range, generally between 20,000 to 400,000 centipoises. Standard viscosities of the glass pastes are 200,000 centipoises ±10%. To provide proper fluidity to the frit suspension prior to applying to the flat planks, a volatile organic carrier selected from an alcohol, as ether, or an acetone is employed.

The frit pastes employed in bonding the graphite reinforced glass flat planks in accordance with this invention have a temperature range from about 450° C.

to about 600° C. The thermal expansion $10^{-7}$ inch/inch/°C. over the temperature range from 0°–300° C. range from 67 to 46 (for the pastes having glass melting temperatures of 450° C. and 600° C. respectively). Since graphite has a thermal expansion of about $-9 \times 10^{-7}$ inch/inch/°C. then the combination of the composite graphite reinforced glass including the glass frit paste has a low coefficient of thermal expansion, thereby permitting heating and cooling rates which do not need to be precisely controlled. The frit used affects only the temperature to which the assembly must be heated to melt the glass in the frit. The frit does not "cure", but resolidifies on cooling, much like a hot-melt adhesive.

The preferred geometric shape of the grid shape is normally in the form of a square to achieve properly matched bonding surfaces. Though a triangular grid is also possible, it is more difficult to produce and has no apparent advantages over a square structure.

The steps of notching the flat planks to be bonded as described and shown in the drawing is completed. The wet frit is then applied to the surfaces which are to be bonded, the parts are assembled and then allowed to dry at room temperature overnight, allowing the volatile carrier to evaporate.

The bonding step is carried out in an oven. In the bonding process, the dried assembly of parts is placed in an oven in an air atmosphere and heated to the melting point of the powdered glass contained in the frit. The assembly is held at this temperature long enough to ensure that the entire assembly has reached the proper temperature, then the oven is turned off and allowed to cool.

The above description described the procedure for fabricating a core member. When a structure is desired which is comprised of a core member, a backplate member, and a faceplate member, the top and bottom edges of the core member planks are coated with frit and the backplate member and the faceplate member, one which is to be bonded to each respective side of the core member, is each coated with frit and allowed to dry before the bonding procedure is begun.

As previously described, the thermally stable honeycomb panel is bonded in an oven, preferably in an atmosphere of air or inert gas. A small load is placed on top of the panel to ensure contact between the parts being bonded.

I claim:

1. A method for forming a thermally stable honeycomb panel comprised of a core member, a faceplate member, and a backplate member with each of said members being constructed of one or more thermally stable composite planks comprised of about 50% graphite fibers and of about 50% borosilicate glass and formed by hot pressing in vacuum, said method comprising first constructing a core member by a process A which comprises completing the steps (i-vii) of said process A as follows:

(i) providing a plurality of said thermally stable composite planks having a predetermined length of l, predetermined width of w, and predetermined thickness of t;

(ii) notching said planks individually along said length of l to form a series of equally spaced notches with a depth equal to ½w and a width equal to t;

(iii) applying to each of said notched surfaces, a wet frit paste which additionally contains a volatile carrier to adjust fluidity, said wet frit paste comprised of a borosilicate glass suspended in an organic binder designed to boil out completely below the glass melting temperature of said thermally stable planks, said borosilicate glass having a thermal expansion of from about 67 to about $46 \times 10^{-7}$ inch/inch/°C. over the temperature range from 0° C.–300° C. and a glass melting temperature of about 450° C. to about 600° C.;

(iv) assembling said plurality of notched planks to form a series of square honeycomb cells and then allowing the assembled plurality of notched planks to dry at room temperature for a predetermined time period to allow the volatile carrier to evaporate;

(v) completing a bonding process for the dried assembly which comprises placing the dried assembly in an oven in an air atmosphere and heating to a predetermined temperature which is melting point of the glass contained in said frit;

(vi) maintaining the predetermined temperature long enough to ensure that the entire dried assembly has reached the proper temperature to achieve bonding;

(vii) turning the oven off and allowing the dried assembly to cool to room temperature to yield a thermally stable core member; and said method further comprising completing process B set forth hereinbelow for forming said thermally stable honeycomb panel having said core member with a faceplate member and a backplace member bonded at the respective top and bottom outer surfaces thereof of said core member, said process B comprising completing the additional steps (viii-xi) of said process B as follows:

(viii) providing a pair of said thermally stable composite planks of a predetermined length, width, and thickness to serve as a faceplate member and backplate member of said core member when bonded thereto;

(ix) applying a wet frit paste, as defined in step (iii) of process A hereinabove, to the joining surface of said faceplate member and said backplate member and to said core member;

(x) placing said backplate member on a flat surface, placing said core member with applied wet frit paste on top and bottom of exposed thermally stable plank edges, placing said faceplate member on top of said core member, and then allowing said core member, faceplate member, and backplate member to dry at room temperature for a predetermined time period to allow volatile carrier to evaporate; and (xi) completing an equivalent bonding process for the dried honeycomb panel comprised of said core member, said backplate member, and said faceplate member as defined in steps (v-vii) of process A hereinabove and additionally applying a small load on top of said faceplate member to ensure contact between the parts being bonded during said bonding process to thereby complete the forming of a thermally stable honeycomb panel.

2. A thermally stable honeycomb panel formed by the method as defined by claim 1 wherein said honeycomb cells of said core member are square in shape, said thermally stable honeycomb panel formed by said bonding process of claim 1 yielding bond strengths between said core member, said backplate member, and said faceplate member which exhibit parent material strength, said thermally stable honeycomb panel having a thermal expansion value in the range from about $-5$ to about $+5 \times 10^{-7}$ inch/inch/° C. over a range of about 0° C.–300° C.

* * * * *